United States Patent [19]

Lawrence

[11] 4,300,754
[45] Nov. 17, 1981

[54] WELDING CLAMP

[76] Inventor: Bernerd N. Lawrence, Box 174D, R. R. 1, Fieldon, Ill.

[21] Appl. No.: 184,133

[22] Filed: Sep. 4, 1980

[51] Int. Cl.³ .............................................. B25B 11/00
[52] U.S. Cl. .......................................... 269/8; 269/37; 269/69; 269/208; 269/246
[58] Field of Search .................. 269/8, 37, 41, 43, 69, 269/126, 208, 246, 251; 228/49 R

[56] References Cited

U.S. PATENT DOCUMENTS

| | | | |
|---|---|---|---|
| 1,828,791 | 10/1931 | Thompson | 269/8 |
| 2,379,136 | 6/1945 | Erwin et al. | 269/8 |
| 2,884,698 | 5/1959 | Würsch | 269/8 X |
| 3,491,995 | 1/1970 | Taraba | 269/8 |
| 3,593,982 | 7/1971 | Price | 269/8 |
| 3,621,553 | 11/1971 | Lafeber | 269/8 X |

FOREIGN PATENT DOCUMENTS 971831 10/1964 United Kingdom .................... 269/8

Primary Examiner—Robert C. Watson
Attorney, Agent, or Firm—Kalish & Gilster

[57] ABSTRACT

A clamp for holding work pieces in assembled relationship for welding and the like comprising a pair of discrete posts and a transverse member, as fabricated preferably of bar stock. Each of the pair of posts pivotally mounts a magnet at the lower end thereof and cooperative interengagement expedients are provided on the posts and transverse member to permit of interengagement in preselected relationship. A threaded hold-down member is adapted for mounted disposition upon the transverse member in predetermined relationship thereto.

7 Claims, 4 Drawing Figures

WELDING CLAMP

BACKGROUND AND SUMMARY OF THE INVENTION

This invention relates in general to work-holders and, more particularly, to a clamp especially adapted for welding.

Heretofore, limited efforts have been made to develop, what are sometimes referred to as, fitting-up tools for maintaining work pieces in desired relationship for reliable welding and with such tools, there has been, in general, a resort to magnetic means for interengaging the tool and the work pieces for promoting appropriate securement during operation. One such effort is disclosed in U.S. Pat. No. 2,379,136, granted June 26, 1945, which shows the use of an electromagnet connected by a cable to a suitable source of electrical energy and with threaded members or so-called jack screws on either side thereof. The device of this patent is an integrated structure. Another effort is disclosed in U.S. Pat. No. 3,593,982 which is also an integrated structure embodying at one end a U-shaped permanent magnet and with the tension member or jack screw 13 at the other end. These structures are exemplary of the prior art demonstrating an exceedingly limited range of adjustability being more or less designed for relatively specific work arrangements. Furthermore, each is devoid of what might be considered a balanced magnetic condition since with the former, the application of a strong magnetic force would tend to push the work material away from the jack screws and, thus, render uncertain the results to be obtained; while, in the latter, exertion of a relatively strong holding force by the jack screw might tend to cause the magnet to loose contact.

Therefore, it is an object of the present invention to provide a work-holder or clamp of the character stated which is comprised of a plurality of discrete components adapted for interengagement throughout a wide range of positions of adjustment for accommodating a veritable multiplicity of work piece attitudes.

It is another object of the present invention to provide a clamp of the character stated embodying simple but fully reliable means for detachably interengaging the constituents.

It is a still further object of the present invention to provide means for easily interengaging the components of the clamp without resort to tools or other extrinsic devices whereby the clamp is fully self-contained.

It is another object of the present invention to provide a clamp of the character stated embodying magnets presented in balanced relationship and which are adapted for relative rockability to assure effective securement to uneven or irregular surfaces as well as to assure presentation of the device in fully effective condition despite any unevenness, tilting, or the like of the work pieces.

It is a still further object of the present invention to provide a clamp of the character stated which embodies a hold-down member so disposed with respect to the magnets as to prevent any untoward disengagement of the latter through application of relatively increased holding forces.

It is a further object of the present invention to provide a clamp of the character stated which comprises a plurality of simple, sturdy, and extremely durable components; which clamp may be economically produced; which may be utilized without developed skill on the part of the user; which may be effectively employed for work holding in other than welding situations; and which is reliable in use.

DESCRIPTION OF THE PREFERRED EMBODIMENT

Figure 1:
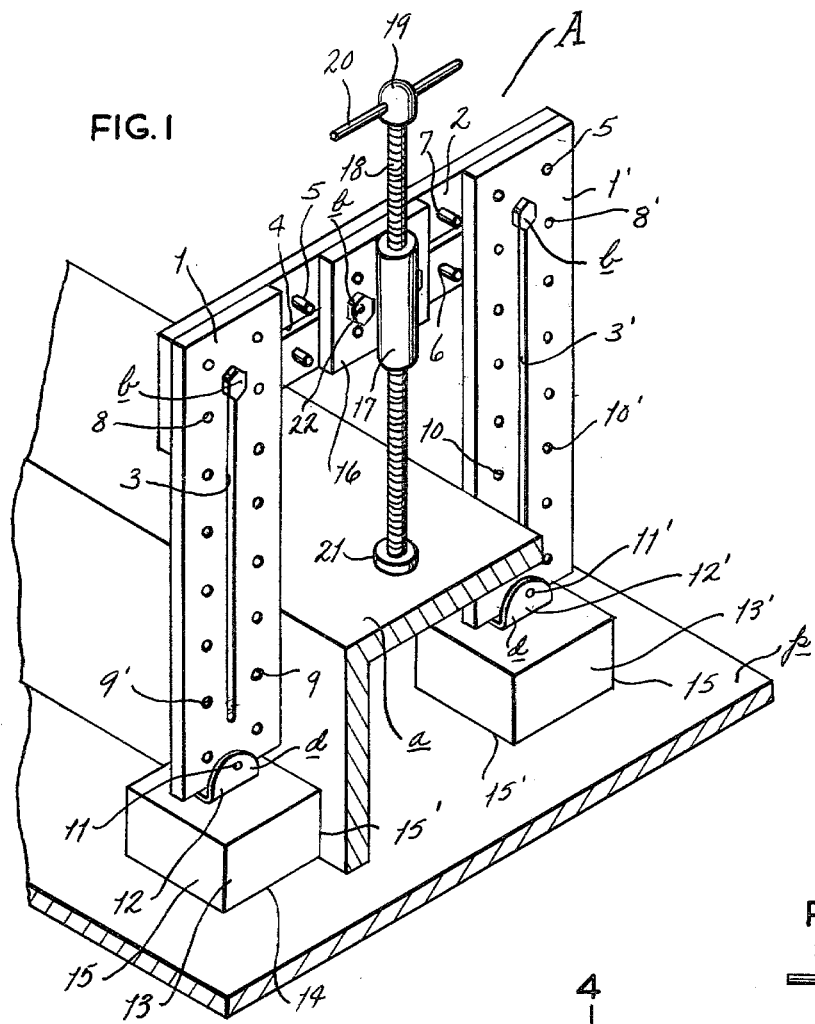
FIG. 1 is a perspective view of a welding clamp constructed in accordance with and embodying the present invention, illustrating the clamp in operative position.
Figure 2:
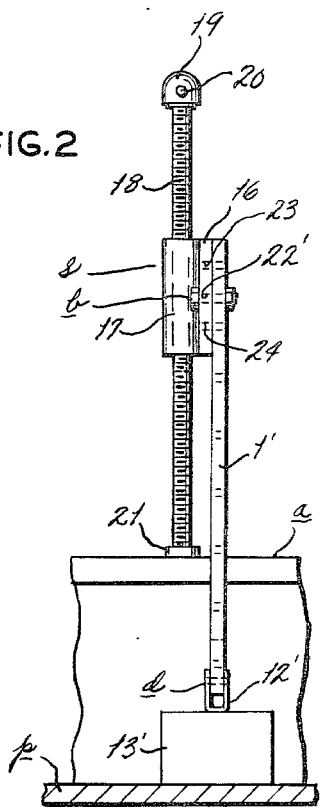
FIG. 2 is a fragmentary side elevational view of the welding clamp in operative position.
Figure 3:
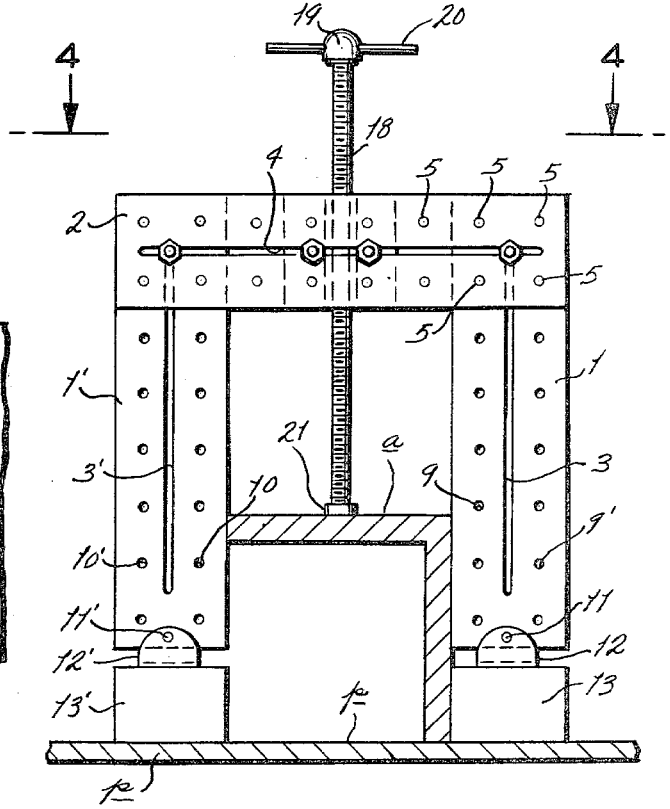
FIG. 3 is a rear elevational view of the welding clamp as shown in FIG. 1.
Figure 4:
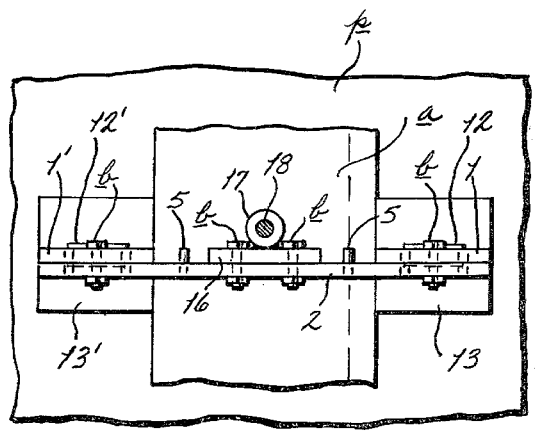
FIG. 4 is a top plan view taken along line 4—4 of FIG. 3.

Referring now by reference characters to the drawings which illustrate the preferred embodiment of the present invention. A generally designates a clamp device designed to reliably maintain, preferably, metallic work components in generally assembled relationship for facilitating mutual engagement, as by welding; said device comprising a pair of normally vertical members or posts 1, 1' and a transverse or bridging member 2, all being formed, preferably, of flat bar stock. It is indeed obvious that said posts 1, 1' and transverse member 2 may be of any desired dimensions but it has been found, in the course of conventional welding shop practice, that a thickness of ⅜ inch; a width of 3 inches; and a length in the order of 12 inches will accommodate the majority of the conditions encountered.

Each of said posts 1, 1' and transverse member 2 contains an elongated, narrow, slot-like aperture 3, 3', and 4, respectively, which latter terminate at the ends thereof spacedly from the proximate end edges of the related posts or member as the case may be; said apertures being designed for receiving a retention bolt for purposes presently to be described. It will be seen that slots 3, 3', and 4 are respectively coaxial with the major axis of the related post 1, 1' and member 2.

Said transverse member 2 is provided, on either side of the associated slot 4, with a plurality of pins 5 as of the steel dowel type fixed within appropriate openings formed in transverse member 2 and arranged in an upper and lower row, as at 6, 7, with the spacing between such pins being predetermined; said pins 5 projecting beyond one face of said transverse member 2 for reception within complementary formed holes 8, 8' provided in posts 1, 1', respectively. Holes 8, 8' within the respective post 1, 1' are arranged in vertically progressing inner and outer rows 9, 9', and 10, 10' in post 1, 1', respectively, which said rows are actually parallel to the associated slot 3, 3' and equidistant therefrom, on opposite sides thereof.

Accordingly, it will be seen that posts 1, 1' and transverse member 2 may be initially interengaged by means of extension of pins 5 in transverse member 2 within predetermined holes 8, 8' in posts 1, 1' which will be discussed hereinbelow.

At the lower end of each post 1, 1', there is fixedly mounted, as by means of a pivot pin 11, 11', respectively, an upwardly opening clevis 12, 12', respectively, pins 11, 11' being engaged at their ends within arms d of the respective clevis 12, 12' and extending through appropriate openings with in posts 1, 1'. Each clevis 12, 12' is secured upon the upper surface of a permanent magnet 13, 13', respectively, of generally block-rectangular configuration, each having flat base and end surfaces 14, 15, and 15', respectively. It will, therefore, be seen by means of pivot pins 11, 11' said magnets 13, 13' are vertically swingable about the axis of said pivot pins 11, 11' within a limited range by reason of the character of the clearance between the posts 1, 1' and the upper surface of associated magnets 13, 13'.

It is to be understood that the particular configuration of magnets 13, 13' is not critical since the same could, with equal effectiveness, be of general cylindrical form.

Presented for engagement upon transverse member 2 in selected relationship thereto is a screw support s comprising a mounting plate 16 having a height corresponding generally to the height or width, as it were, of transverse member 2 and being of short length. Centrally of plate 16 there is fixed, as by welding, an internally threaded sleeve 17 for accepting an elongated adjusting screw 18 incorporating an enlarged head 19 with a short cross rod 20 for manipulative purposes and with there being a diametrically enlarged cap or plug 21 rigid on the lower end of said screw 18. On either side of sleeve 17, in the intermediate portion of plate 16, are horizontally aligned openings 22, 22' for registration with slot 4 of transverse member 2, and with the diameters of said openings 22, 22' being comparable to the width of slot 4 for intimately accepting bolts or other fasteners extending therethrough. Plate 16 also carries both above and below each opening 22, 22' an upper and a lower aperture 23, 24 dimensioned and located for receiving pins 5 from transverse member 2 to effect detachable engagement of mounting plate 16 upon transverse member 2.

From the foregoing, the use of device A should be relatively clear. Posts 1, 1' and transverse member 2 are, by reason of their unique construction, adapted for relative engaged disposition to accommodate an infinitude of work arrangements so as to maintain the same in desired relative position during welding or other securing procedures such as, for instance, during the setting of adhesives, etc. With magnets 13, 13', device A is primarily designed for utilization with metallic, magnetizable work pieces such as for illustration only shown in FIG. 1 as constituting a flat plate p and an angle section a. Thus, for purposes of exhibition only, angle section a is disposed upon plate p in the intended condition of ultimate relationship and device A is accordingly adjusted to maintain said pieces in such relationship while welding is undertaken to render angle section a permanently fixed. Thus, posts 1, 1' are presented on either side of angle section a with the edges of the former abutting against confronting surface portions of said angle section a. Magnets 13, 13' are thus seated upon plate p and, by reason of the magnetic quality, temporary adhere thereto in a manner resistant to accidental displacement of said posts 1, 1'. Then transverse member 2 is secured upon said posts 1, 1' a preselected distance above the upper face of angle section a in order to provide adjusting screw 18 ample distance for effectiveness. Pins 5 within transverse member 2 are thus engaged within the particular openings 8, 8' of posts 1, 1' and slot 4 of transverse member 2 will be in registration with a portion of slots 3, 3' so that bolts b may be extended therethrough and made secure as by means of conventional nuts. By means of pins 5 and bolts b, posts 1, 1' and transverse member 2 are integrated into a unitary structure fully resistant to any untoward or accidental shifting or relative displacement.

Then mounting plate 16 together with the supported adjusting screw 18 is attached to transverse member 2 at such location as to present adjusting screw, desirably, intermediate posts 1, 1' with such attachment being by bolts and through pins 5 from transverse member 2 projecting through apertures 23, 24; and with bolts b extending through openings 22, 22' and the registering portions of slot 4. With mounting plate 16 secured, the user will then rotate screw 18 to cause same to be threaded downwardly in order to place plug 21 into forceful disposition upon the particular work piece, as angle section a in the present instance. Thus, screw 18 produces a compressive effect upon the engaged work member insuring its maintenance in assembled position.

From the foregoing, it will be evident that the work components are subjected to positive holding forces through the restrictive embrace of posts 1, 1' and the downwardly directed force brought about by adjusting screw 18; as well as the positive interengagement with magnets 13, 13' which, as shown, may be presented to engage both work components and thereby enhance the reliability of presentation of the latter.

The pivotal mounting of magnets 13, 13' promotes a very developed degree of versatility of device A since the same are free to rock with respect to posts 1, 1' for compensating for any unevenness or irregularity in the surface of the engaged work pieces as well as for any tilting resulting from the nature of the support surface. Thus, posts 1, 1' may retain their axial parallelism and thereby cause transverse member 2 to be presented horizontally in order that adjusting screw may apply its full downward holding force upon the particular work piece.

In view of the foregoing, it is quite evident that device A provides a degree of adjustability not hitherto attained by current structures, with posts 1, 1' and transverse member 2 being adapted for detachable interengagement in a multiplicity of arrangements in order to accommodate, in a most facile manner, the work components to be welded, bonded, or otherwise mutually secured. Such adjustability insures that adjusting screw 18 will be positioned so as to present the requisite holding force upon the work so that accidental displacement is inhibited thereby assuring of positive bonding.

Furthermore, since device A comprehends a plurality of constituents, the same may be stored in minimal space during periods of non-use and the simple, sturdy construction of each constituent promotes longevity of usage. It is also to be observed that in device A magnets 13, 13' are in symmetrical balanced relationship thereby providing a firm and stable base for device A as well as for assuring that the application of any relatively increased holding force by adjusting screw 18 will be properly counteracted so that such force will not cause a loss of contact between said magnets and the engaged work pieces.

What is claimed is:

1. A work-engaging clamp comprising a pair of discrete, independently constructed, vertically presented posts, a transverse member for disposition axially normal to said posts, first and second cooperative means for detachably interconnecting said transverse member and said posts for relative adjusted positioning of said transverse member with respect to said posts, said first cooperative means comprising an elongated slot-like aperture extending longitudinally of each post and of said transverse member, and fasteners extensible through each post aperture and the aligned coordinating portion of the said aperture of the transverse member, said second cooperative means comprising pin elements fixed in said transverse member and projecting outwardly from one face thereof in axially normal relationship to the plane of said transverse member, and openings contoured and dimensioned for complementarily receiving said pin elements provided in horizontal and vertical arrangement in each post whereby through said first and second cooperative means said transverse member may be securely engaged to said posts for presentation at a preselected position vertically thereof as well as said posts being disposed in predetermined spaced-apart horizontal relationship lengthwise of said transverse member, a mounting plate, means detachably engaging said mounting plate on said transverse member for preselected disposition thereon between said posts, an elongated hold-down member carried on said plate in axially parallel relationship to said posts, there being a work-contacting element carried at the lower end of said hold-down member, and a work-engaging foot affixed to the lower end of each post.

2. A work-engaging clamp as defined in claim 1 wherein each foot is a magnet pivotally engaged to the related post.

3. A work-engaging clamp as defined in claim 2 and further characterized by said magnets being of the permanent type.

4. A work-engaging clamp as defined in claim 1 wherein an internally threaded sleeve is provided on said mounting plate, said hold-down member being externally threaded and engaged within said sleeve for reciprocal vertical adjustability with respect thereto in order to present the work-contacting element in engagement with the confronting portion of the work.

5. A work-engaging clamp as defined in claim 1 and further characterized by said pin elements on said transverse member being arranged in a plurality of rows axially parallel with the major axis of said transverse member, and with said pin elements being spaced apart a predetermined distance, said complementary openings being arranged in a plurality of rows in each of said posts.

6. A work-engaging clamp as defined in claim 5 and further characterized by said elongated slot-like apertures in said posts terminating at the ends thereof spacedly from the proximate end of the associated post and said transverse member, said apertures being of like width, and said means detachably engaging said mounting plate being fasteners for extension through said plate and the elongated slot-like aperture of the transverse member.

7. A work-engaging clamp as defined in claim 6 and further characterized by the elongated aperture in said transverse member being disposed between rows of said pin elements, and said aperture in each of said posts being located between rows of said complementary openings.

* * * * *